Figures 1, 2:
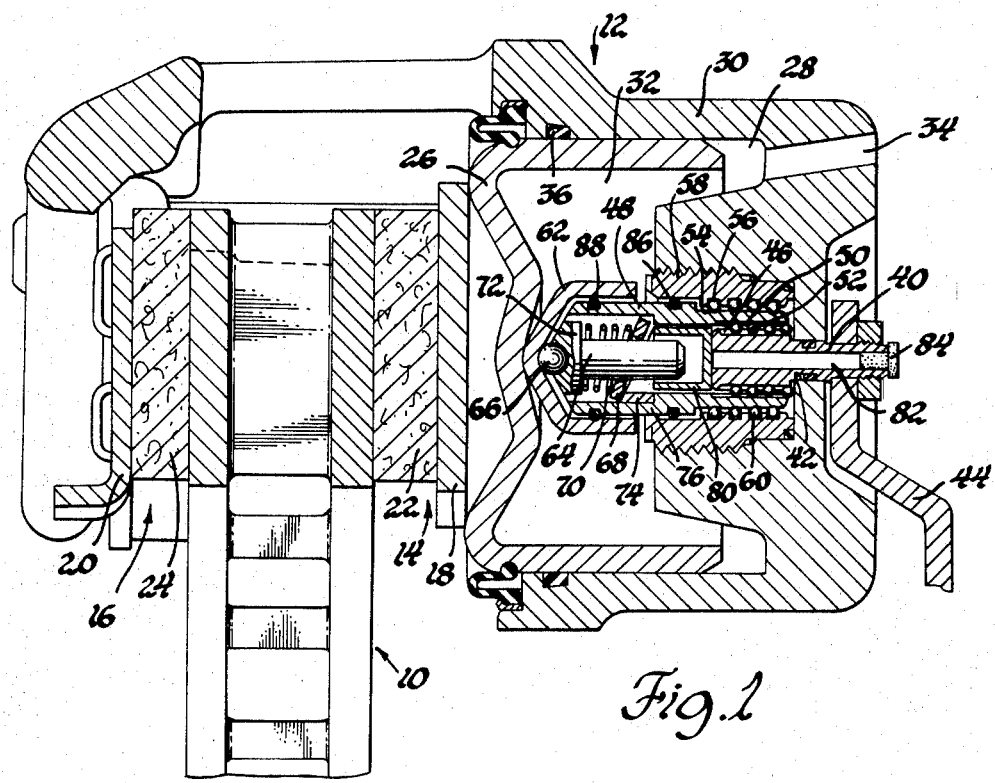

United States Patent [19]
Naismith et al.

[11] 3,724,605
[45] Apr. 3, 1973

[54] DISC BRAKE WITH INTEGRAL PARKING BRAKE

[75] Inventors: Thomas D. Naismith, Dayton; Ronald L. Shellhause, Vandalia, both of Ohio

[73] Assignee: General Motors Corporation, Detroit, Mich.

[22] Filed: Nov. 3, 1971

[21] Appl. No.: 195,285

[52] U.S. Cl. ............................188/71.8, 188/196 P
[51] Int. Cl. ............................................F16d 65/54
[58] Field of Search ..................188/71.7, 71.8, 196 P

[56] References Cited

UNITED STATES PATENTS

| | | | |
|---|---|---|---|
| 2,951,560 | 9/1960 | Smellie | 188/71.8 |
| 3,589,478 | 6/1971 | Plaat et al. | 188/71.8 X |
| 3,589,479 | 6/1971 | Plaat et al. | 188/71.8 X |
| 3,605,959 | 9/1971 | Beck | 188/71.8 X |

*Primary Examiner*—M. Henson Wood, Jr.
*Assistant Examiner*—Michael Mar
*Attorney*—W. E. Finken et al.

[57] ABSTRACT

A disc brake caliper assembly includes a hydraulically actuated first piston, a second piston engagable with the first piston, a mechanical actuating mechanism which moves axially into the housing when actuated, and an extendable member acting between the adjuster piston and the mechanical actuating mechanism and including an apertured locking plate closely surrounding a shaft to form a one-way clutch. The extendable member provides a rigid force transmitting linkage between the mechanical actuating mechanism and the pistons for mechanical actuation of the brake. An adjuster spring increases the length of the extendable member to move the adjuster piston into closer relationship with the disc to adjust for lining wear.

5 Claims, 2 Drawing Figures

INVENTORS
Thomas D. Naismith, &
BY Ronald L. Shellhause
D. D. McGraw
ATTORNEY

3,724,605

DISC BRAKE WITH INTEGRAL PARKING BRAKE

The invention relates to an improved disc brake assembly and more particularly to a disc brake caliper assembly which provides hydraulic actuation for service braking, mechanical actuation for parking braking and automatic adjustment for lining wear.

It is desirable in an automotive disc brake caliper assembly to provide hydraulic actuation of the brakes for service braking and mechanical actuation of the brakes for emergency or parking braking. It is also desirable to provide an automatic wear adjusting mechanism.

The disc brake caliper assembly of this invention includes a first piston slidable within the caliper housing and hydraulically actuable to force brake pad assemblies against the disc. A second or adjuster piston is also sealingly slidable in the housing and is engageable with the first piston to limit retraction thereof. A mechanical actuating mechanism is provided which moves axially into the housing toward the disc when actuated. An extendable member including a shaft engaging the adjuster piston and an apertured locking plate closely surrounding the shaft acts between the adjuster piston and the mechanical actuating mechanism. The mechanical actuating mechanism is engageable with the apertured locking plate along a limited circumferential portion thereof and a spring acts between the shaft and the locking plate to cock the locking plate into frictional locking engagement of the shaft. The extendable member provides a rigid force transmitting linkage between the mechanical actuating mechanism and the pistons for mechanical actuation of the brake. The adjuster spring increases the length of the extendable member to move the adjuster piston into closer relationship with the disc and renewed contact with the first piston whenever lining wear is encountered so as to minimize the extent of actuation on the mechanical actuating means necessary for a subsequent mechanical actuation. A release cup provided within the mechanical actuating mechanism and surrounding the shaft of the extendable member can be forced against the apertured locking plate to release the locking plate from frictional engagement of the shaft so that the extendable member can be collapsed to facilitate replacement of the brake linings. In a second embodiment of the invention a limited amount of lash or play is provided in the mechanical actuating mechanism to permit limited retraction of the piston and extendable member into the housing to compensate for brake lining swell.

One feature of the invention is the provision of a disc brake caliper having an integral mechanical actuating mechanism with automatic wear adjustment.

Another feature of the invention is the provision of automatic adjusting mechanism which functions to compensate for even the smallest increments of lining wear.

The invention also features a device for collapsing the wear adjusting extendable member without extensive disassembly of the caliper to facilitate a brake lining replacement.

A further feature of the invention is the provision of a disc brake caliper having an integral mechanical actuating and wear adjusting mechanism which accommodates lining expansion.

Another feature of the invention is a wear adjusting mechanism which adjusts for wear only when the brake is released so that caliper deflection will not be compensated for.

These and other features of the invention will become apparent upon consideration of the following specification and the drawings in which:

FIG. 1 is a cross sectional view of a caliper assembly embodying the invention; and FIG. 2 is a fragmentary cross section view of a disc brake caliper assembly embodying a second form of the invention.

Referring to FIG. 1, the disc brake assembly includes a rotatable disc 10 which is attached to the vehicle wheel assembly and a caliper assembly 12. Inner and outer brake shoe assemblies 14 and 16 respectively include backing plates 18 and 20 to which are secured suitable brake linings 22 and 24.

Shoe assemblies 14 and 16 are respectively positioned in the caliper assembly 12 on opposite sides of the disc 10. Piston 26 is slidable in an axially extending bore 28 formed in the caliper housing 30 and forms therewith a fluid chamber 32. Inlet port 34 communicates fluid pressure from a master cylinder, not shown, to the fluid chamber 32. Piston 26 engages the brake shoe assembly 14 so that when chamber 32 is pressurized piston 26 moves in the caliper housing 30 in the direction toward disc 10 forcing the shoe assembly into braking engagement with the disc 10 while the reaction force transferred to the caliper housing 30 forces the brake shoe assembly 16 into engagement with the other side of the disc 10. The hydraulic force is typically of such a magnitude as to result in deflection of that portion of the caliper housing 30 which bridges the periphery of the disc 10. When hydraulic pressure is relieved from the hydraulic chamber 32, the piston 26 is retracted into caliper housing 30 as the caliper deflecting force is relieved. A pressure seal 36 located between caliper housing 30 and piston 26 provides sufficient resistance to retracting movement of piston 26 to hold the brake linings 22 and 24 in contact with disc 10 upon brake release.

An extendable wear adjusting mechanism which limits retracting movement of the piston 26 into the housing 30 and a mechanical mechanism for actuating the brake is also provided. A rotatable member 40 extends through a bore 42 in caliper housing 30. A lever 44 is attached to the outer end of rotatable member 40 and is connected to the emergency and parking brake control mechanism, not shown. The portion of rotatable member 40 inside the caliper housing 30 is provided with a number of circumferentially spaced axially extending grooves 46. A sleeve 48 is located in caliper housing 30 and surrounds the rotatable member 40. A series of axially extending grooves 50 are formed on the inner periphery of sleeve 48 and are aligned with the grooves 46 of rotatable member 40. A number of bearing balls 52 are located in the grooves providing a low friction axial spline connection between the rotatable member 40 and the sleeve 48. A helical groove 54 is formed on the outer periphery of sleeve 48 and a mating helical groove 56 is formed on an insert 58 which threadedly engages the housing 30. A number of bearing balls 60 are located in the helical grooves 54 and 56 providing a helical spline connection between the housing 30 and the sleeve 48 so that when rotatable member 40 and the sleeve 48 splined thereto are rotated the sleeve 48 moves axially within the housing 30.

An adjuster piston 62 is sealingly slidable on the sleeve member 48 and is engageable with the first piston 26. A shaft 64 is located within sleeve 48 and piston 62 and is engageable with piston 62 through the intermediary of thrust ball 66. A locking plate or disc 68 is apertured to closely surround the shaft 64. A cam wedge 74 is seated on a shoulder 76 of the sleeve 48. A preloaded spring 70 surrounds shaft 64, and acts between a shoulder 72 of shaft 64 and the locking plate 68, thereby urging locking plate 68 into engagement of the cam wedge 74 and holding adjuster piston 62 in engagement with piston 26. The cam wedge 74 engages the locking plate 68 along a minor circumferential portion thereof so that the spring 70 cocks the locking plate 68 into frictional locking engagement with the shaft 64, thereby forming a one-way clutch which prevents shaft 64 from moving relative sleeve 48 in the direction away from disc 10 but permits its movement toward disc 10. Thus, it may be seen that the retracting movement of first piston 26 is limited by its engagement with second piston 62 since the shaft 64 cannot be moved in the retracting direction.

Mechanical actuation of the brake is initiated by rotation of lever 44 and the rotatable member 40 connected thereto. Rotation of rotatable member 40 imparts rotary movement to sleeve 48 through the action of balls 52 in grooves 46 and 50, and results in axial movement of sleeve 48 toward the disc 10 by virtue of the balls 60 riding in helical grooves 54 and 56. The axial movement of sleeve 48 is transmitted through cam wedge 74, locking plate 68, shaft 64, thrust ball 66, adjuster piston 62, and first piston 26 to the brake pad assembly 14 causing the brake pads to be forced against the disc. Return of lever 44 to its initial rest position permits the aforelisted parts to return to their initial positions to release the brake. If brake linings 22 and 24 have worn during the mechanical actuation, the pistons 26 and 62 will not be returned to their premechanical actuation positions within caliper housing 30. In this event, sleeve 48 and cam wedge 74 return to their positions in the housing and spring 70 holds second piston 62 against first piston 26 while causing the locking plate 68 to frictionally disengage and move along shaft 64 to maintain its engagement with cam wedge 74. Subsequent to this adjusting movement, piston 26 cannot be knocked back into the caliper since the locking plate 68 will have once again frictionally engaged the shaft 64.

During hydraulic actuation of the brake the piston 26 is displaced out of caliper housing 30 and away from adjuster piston 62. A seal 86 located between insert 58 and sleeve 48 and a seal 88 located between sleeve 48 and piston 62 prevent the pressure in fluid chamber 32 from acting on he inner portion of piston 62 so that the net hydraulic force acting on piston 62 in the retracting direction prevents the adjuster spring 70 from adjusting the piston 62 toward disc 10 when the brake is being hydraulically applied. This prevents caliper deflection from resulting in false adjustment. If lining wear occurs during such hydraulic actuation, the first piston 26 will not return to its preactuation position engaging adjuster piston 62. In this event, spring 70 moves shaft 64, ball 66, and adjuster piston 62 toward the disc to reengage adjuster piston 62 with the first piston 26. Subsequent to this wear adjusting movement of adjuster piston 62, first piston 26 cannot be knocked further back into the caliper since the locking plate 68 once again frictionally engages the shaft 64. It should be noted that since the adjusting mechanism depends on the movement of apertured locking plate 68 on the smooth surface of shaft 64, the adjusting mechanism can function to correct even the smallest increment of lining wear.

In order to permit replacement of the inner and outer brake shoe assemblies 14 and 16, provision is made to release the wear adjusting mechanism. A release cup 80 surrounds the end of shaft 64 and is normally seated against rotatable member 40. A passage 82 is provided through the rotatable member 40 so that a rod may be inserted through rotatable member 40 into engagement with release cup 80. The rod may then be utilized to push release cup 80 toward the disc whereby it engages locking plate 68 at a point diametrically opposite the wedge 74 so that the locking plate is urged out of frictional engagement with the shaft 64. The piston 26 may then be fully retracted into the caliper housing 30 to permit lining replacement. A plug 84 seals passage 82 to prevent entry of foreign matter.

Referring to FIG. 2, the second embodiment of the invention is shown, the various structural elements being identified by reference numerals corresponding to those of the corresponding elements of FIG. 1. In the embodiment of FIG. 2, the adjuster piston 62 is slidable within housing 30 and a single seal 96 is located between the adjuster piston 62 and the caliper housing 30. Furthermore, a pair of apertured locking plates 98 and 100 closely surround shaft 64 to provide increased load capacity for the mechanical actuating function of the extendable member. In the embodiment of FIG. 2, the cam wedge 74 of FIG. 1 has been eliminated by making the apertures through the locking plates 98 and 100 at an angle to the axis of the locking plates so that locking plate 100 directly engages sleeve 48. In this case, the release cup 80 has a beveled end so that it may engage the locking plate 100 at a point diametrically opposite its point of engagement with the sleeve 48 to collapse the extendable member, thereby facilitating lining replacement.

The embodiment of FIG. 2 also allows the rear adjusting mechanism to compensate for lining expansion due to heat generated by braking. This compensation is provided by lash or play in the helical spline connection between insert 58 and sleeve 48. This lash is built into the helical spline connection by providing a helical groove 56 formed in the insert which is of width in excess of the width of bearing ball 60 engaged therein. A Bellville spring 102 acts between the caliper housing 30 and the end of sleeve 48 to urge sleeve 48 toward the disc 10. When the brake linings expand into forced engagement with the disc 10 when the brakes are not actuated, the reaction force transferred to caliper 30 and piston 26 can compress Bellville spring 102 permitting the piston 26 to retract into caliper housing 30 to relieve the brake engaging force resulting from the expansion. The degree to which such expansion may be compensated for is a factor of the amount of lash provided and the spring rate of Bellville spring 102. It is noted that the capacity of Bellville spring 102 must exceed that of the adjuster spring 70 to prevent the adjuster spring 70 from collapsing Bellville spring 102 and moving sleeve 48 through the compensating lash between the ball 60 and groove 56.

What is claimed is:

1. A disc brake assembly having a disc and a brake shoe assembly and comprising:
    a housing including means associated therewith and movable axially therein;
    first piston means in the housing engaging the brake pad assembly and forming with the housing a fluid chamber;
    means communicating fluid pressure to the fluid chamber to selectively displace the piston toward the disc to actuate the brake and permit retraction of the piston into the housing to release the brake;
    adjuster piston means in the housing engageable with the first piston to limit retraction thereof;
    extendable force transmitting means extending between the associated means and the adjuster piston means and including, shaft means engaging one of the piston means and associated means, apertured locking plate means closely surrounding shaft shaft means and engaged by the other of the piston means and associated means at only a limited circumferential portion thereof, spring means acting between the shaft means and the locking plate means urging extension of the extendable member to move the adjuster piston in closer wear adjusting relationship to the disc and cocking the apertured locking plate means into frictional engagement with the shaft means so that upon axial movement of the associated means the locking plate means, shaft means, the adjuster piston and the first piston are forced toward the disc to actuate the brake.

2. A disc brake assembly having a disc, a caliper housing, and a brake shoe assembly and comprising:
    first piston means in the housing engaging the brake pad assembly and forming with the housing a fluid chamber;
    means communicating fluid pressure to the fluid chamber to selectively displace the piston toward the disc to actuate the brake and permit retraction of the piston into the housing to release the brake;
    adjuster piston means in the housing and engageable with the first piston to limit retraction thereof;
    shaft means engaging the adjuster piston means;
    apertured locking plate means closely surrounding the shaft means;
    spring means acting between the shaft means and the apertured locking plate means;
    means associated with the housing and movable axially therein, the associated means engaging the apertured locking plate means at only a limited circumferential portion thereof whereby the spring means cocks the apertured locking plate means into frictional engagement with the shaft so that upon axial movement of the associated means the locking plate means, the shaft means, the adjuster piston means and the first piston are forced toward the disc to actuate the brake;
    and seal means associated with the adjuster piston means in a manner to provide upon hydraulic actuation a force acting on the adjuster piston means in the retracting direction whereby the spring means may move the apertured locking plate means on the shaft means to position and hold the second piston means in closer wear adjusting relationship to the disc only when the fluid chamber pressure has permitted retraction of the first piston into the housing.

3. A disc brake assembly having a disc, a caliper housing, and a brake shoe assembly and comprising:
    first piston means in the housing engaging the brake pad assembly and forming with the housing a fluid chamber;
    means communicating fluid pressure to the fluid chamber to selectively displace the piston toward the disc to actuate the brake and permit retraction of the piston into the housing to release the brake;
    adjuster piston means in the housing and engageable with the first piston;
    shaft means engaging the second piston;
    apertured locking plate means closely surrounding the shaft means;
    spring means acting between the shaft means and the apertured locking plate means;
    means associated with the housing and movable therein when actuated, the associated means engaging the apertured locking plate means at only a limited circumferential portion thereof whereby the apertured locking plate means is cocked into frictional engagement with the shaft so that upon axial movement of the associated means the locking plate means, shaft means, the adjuster piston means and the first piston are forced toward the disc to actuate the brake;
    the housing and the means associated therewith having limited axial relative movement therebetween independently of said movement when actuated;
    and second spring means acting between the housing and the associated means to hold the associated means toward the disc and yielding to permit the limited movement of the associated means away from the disc when the brake pad assembly expands into forced engagement of the disc.

4. The disc brake of claim 2 further comprising movable means within the housing engageable with the locking plate means diametrically opposite its point of engagement with the associated means;
    and an axially extending passage through the associated means permitting insertion of a tool to forcibly urge the movable means into engagement with the locking plate means to cock the locking plate means out of frictional engagement of the shaft whereby the shaft means, second piston means, and first piston means may be fully retracted into the housing.

5. The disc brake of claim 2 wherein the means associated with the housing comprises;
    a rotatable member received through the wall of the housing and having circumferentially spaced axially extending grooves formed on the periphery of the portion thereof within the housing;
    sleeve means within the housing having circumferentially spaced axially extending grooves formed on the peripheral portion thereof surrounding the grooved portion of the rotatable member and having on the outer periphery thereof a helical groove;
    a helical groove formed on the housing and mating the helical groove of the sleeve;
    bearing balls located in the respective grooves whereby upon rotation of the rotatable member the bearing balls impart rotary and consequent axial movement to the sleeve.

* * * * *